United States Patent
Gasiorek et al.

(10) Patent No.: US 6,775,579 B2
(45) Date of Patent: Aug. 10, 2004

(54) FLOWCHART-BASED CONTROL SYSTEM WITH ACTIVE DEBUGGING OBJECTS

(75) Inventors: Joseph Gasiorek, Ann Arbor, MI (US); Andrew H. McMillan, Dearborn, MI (US); Michael McFarland, Penobscot, ME (US); James B. Behm, Ann Arbor, MI (US); John Brandow, Adrian, MI (US); Kurudi Muralidhar, Novi, MI (US)

(73) Assignee: Entivity, Inc., Ann Arbor, MI (US)

( * ) Notice: Subject to any disclaimer, the term of this patent is extended or adjusted under 35 U.S.C. 154(b) by 0 days.

(21) Appl. No.: 10/212,460

(22) Filed: Aug. 5, 2002

(65) Prior Publication Data

US 2003/0036813 A1 Feb. 20, 2003

Related U.S. Application Data

(60) Provisional application No. 60/310,387, filed on Aug. 6, 2001.

(51) Int. Cl.[7] .............................................. G05B 19/42
(52) U.S. Cl. ............................ 700/87; 700/18; 700/21; 700/86; 700/88; 714/38; 714/2; 717/109; 717/124
(58) Field of Search ........................ 700/17–18, 86–87, 700/181, 250, 21; 717/124, 125, 129, 109, 1; 345/700; 714/2, 15, 20, 38, 48

(56) References Cited

U.S. PATENT DOCUMENTS

| | | | | |
|---|---|---|---|---|
| 4,852,047 A | * | 7/1989 | Lavallee et al. .............. 700/86 |
| 5,576,946 A | * | 11/1996 | Bender et al. ................ 700/17 |
| 5,926,176 A | * | 7/1999 | McMillan et al. .......... 345/764 |
| 5,970,243 A | * | 10/1999 | Klein et al. .................. 717/113 |
| 6,179,490 B1 | * | 1/2001 | Pruitt .......................... 717/109 |
| 6,226,555 B1 | * | 5/2001 | Kallal et al. .................. 700/21 |
| 6,243,857 B1 | * | 6/2001 | Logan et al. ............... 717/111 |
| 6,275,955 B1 | * | 8/2001 | Klein et al. ................... 714/38 |
| 6,421,821 B1 | * | 7/2002 | Lavallee ...................... 717/109 |
| 6,427,232 B1 | * | 7/2002 | Ku et al. ..................... 717/124 |
| 2001/0011367 A1 | * | 8/2001 | Logan et al. .................. 717/1 |

* cited by examiner

*Primary Examiner*—Ramesh Patel
(74) *Attorney, Agent, or Firm*—Harness, Dickey & Pierce, P.L.C.

(57) ABSTRACT

A machine programming and control system includes a computer including a processor, memory, a display and a device associated with a process. A flowcharting module executed by the computer generates and edits a flowchart that contains action and decision blocks which define logic for operating the device to further the process. The flowcharting module allows active debugging objects to be added to the flowchart. The active debugging objects provide information relating debugging of flowchart code and/or debugging of a portion of the process that is related to the flowchart code. The active debugging object includes at least one of audio, a movie clip, a link to a website, and text demonstrating the desired operation of the process. The active debugging object includes at least one of audio, a movie clip, a link to a website, and text describing correct values for control variables at a first logical point in the flowchart.

16 Claims, 6 Drawing Sheets

FLOWCHART-BASED CONTROL SYSTEM WITH ACTIVE DEBUGGING OBJECTS

CROSS-REFERENCE TO RELATED APPLICATIONS

This application claims the benefit of U.S. Provisional Application No. 60/310,387, filed Aug. 6, 2001, which is hereby incorporated by reference.

FIELD OF THE INVENTION

The present invention relates to programming and control systems. More particularly, this invention relates to flowchart-based programming and control systems that include active debugging objects.

BACKGROUND OF THE INVENTION

Programming and control systems are generally used for controlling processes that involve devices such as relays, solenoids, motors, valves, switches, and other electrical and electromechanical devices. The processes that are controlled include machining, drilling, welding, spraying paint, mixing materials, assembling parts, handling materials, and other similar processes.

Conventional programming and control systems generally employed ladder diagrams and relay ladder logic (RLL) to control the operation of the devices that are associated with the processes. In practice, however, programmers tend to use a flowchart to initially define the operation of the devices in the process. Then, the programmers manually translated the flowchart into the ladder diagrams. The programmers employ the flowcharts as a first step because the flowcharts emulate human thought processes whereas the ladder diagrams do not. Subsequently, developers created programming and control systems that control the process directly from the flowchart logic. One flowchart-based system is disclosed in "Continuous Flowchart, Improved Data Format and Debugging System For Programming and Operation of Machines", U.S. Pat. No. 4,852,047, which is hereby incorporated by reference.

Flowcharts generally include action blocks that represent an operation or action based on current input and output data. Action blocks generally have one entry point that is usually located at the top and one exit point that is usually located at the bottom. A branching or decision block is a diamond-shaped block that represents a branch in the control path based on the results of a decision. Decision blocks generally have one entry point that is usually located at the top and two exit points that are usually located at the side and the bottom. Using combinations of the action and decision blocks, a programmer creates a flowchart that controls one or more devices that are associated with a process.

Programming and control systems generally provide an operating mode and a debugging mode. In the debugging mode, the programmer monitors the flowchart object code as it is executed. In some systems, a currently executing logic block is highlighted in real time while it is executing. Multiple watch windows allow a user to view different flowcharts or different parts of the same flowchart while it is executing. The debugging mode may also include a step-by-step executing mode. In other words, the developer uses a mouse or a keyboard to trigger one logic block to be executed at a time. After each logic block is executed, the developer checks the state of control variables and device operation to determine whether a desired response or logic state is achieved. The debugging process often takes a long time and increases the cost of the project.

SUMMARY OF THE INVENTION

A machine programming and control system according to the present invention includes a computer with a processor, memory, and a display and a device associated with a process. A flowcharting module executed by the computer generates and edits a flowchart that contains action and decision blocks that define logic for operating the device to further the process. The flowcharting module allows active debugging objects to be added to the flowchart.

In other features, the active debugging objects provide information relating to debugging of flowchart code and/or debugging of a portion of the process that is related to the flowchart code. The active debugging objects may include an icon that is added to the flowchart adjacent to related flowchart code to visually identify the active debugging object.

In still other features, the active debugging object provides at least one of audio, a movie clip, a link to a website and textual information. The active debugging object includes at least one of audio, a movie clip, a link to a web site and text demonstrating the desired operation of the process. The active debugging object includes at least one of audio, a movie clip, a link to a website and text describing correct values for control variables at a first logical point in the flowchart.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The ensuing detailed description provides preferred exemplary embodiments only and is not intended to limit the scope, applicability or configuration of the present invention. Rather, the ensuing detailed description of the preferred exemplary embodiments will provide those skilled in the art with an enabling description for implementing the preferred exemplary embodiments of the present invention. It being understood that various changes may be made in the function and arrangement of the elements without departing from the spirit and scope of the invention as set forth in the appended claims.

A programming and control system according to the invention provides active debugging objects that are added to a flowchart that is created by the programming and control system for operating devices that are associated with a process. The active debugging objects provide audio and/or visual feedback such as help files that include text and images, multi-media content such as audio and video, links to web sites containing relevant information, and other suitable links, information or content that assist a programmer with debugging control logic. The active debugging objects are visible during the debugging process. The active debugging objects are preferably implemented using active components such as ActiveX® components or other suitable components.

Figure 1:
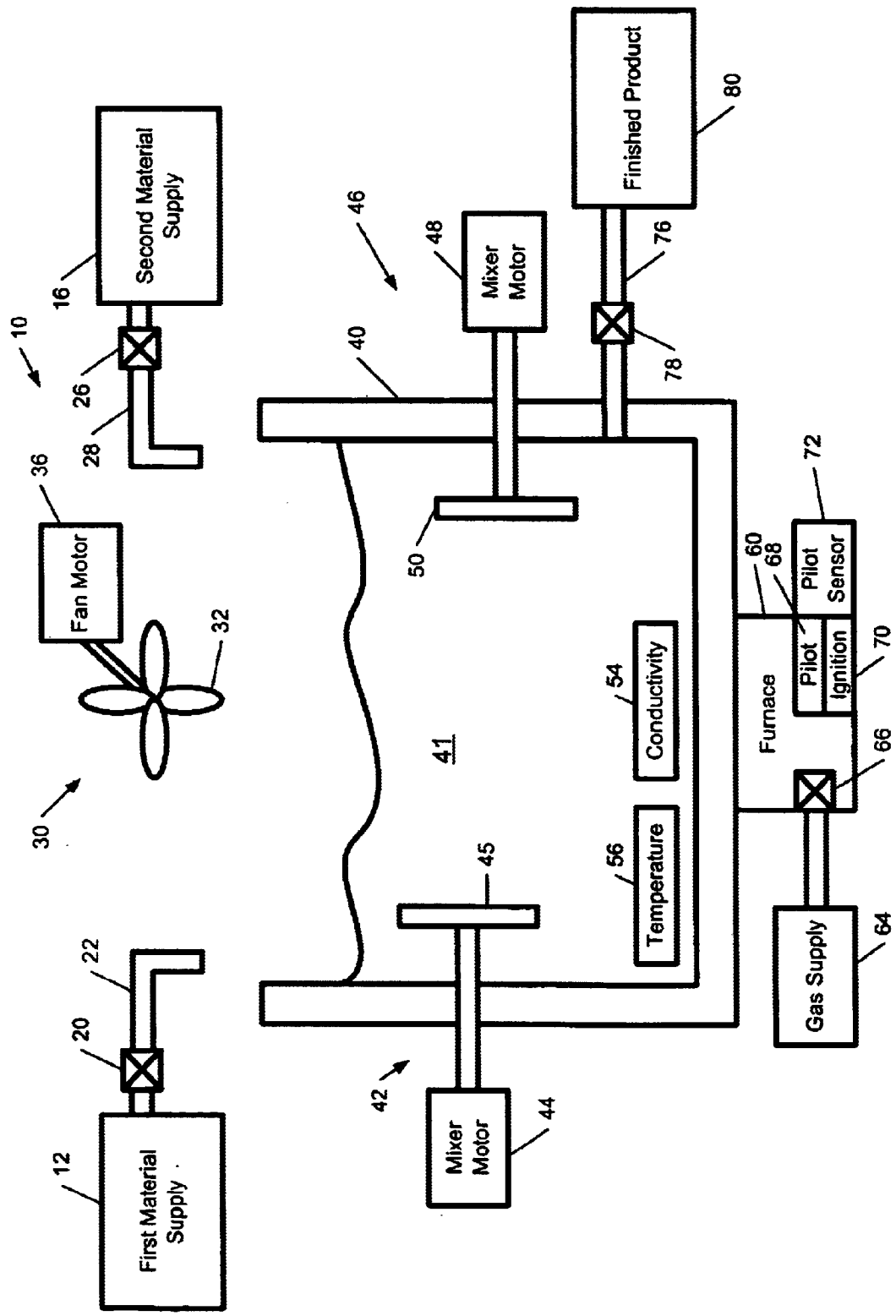
FIG. 1 is a functional block diagram of an exemplary process for illustrating the present invention.

Referring now to FIG. 1, an exemplary process 10 will be employed to illustrate the invention. The process 10 heats and mixes two materials until their conductivity reaches a pre-selected conductivity. Then, the process delivers the materials to a holding tank. The process 10 includes a supply 12 for a first material and a supply 16 for a second material. A first solenoid valve 20 is positioned in line with a conduit 22 to control the delivery of the first material. A second solenoid valve 26 is positioned in line with a conduit 28 to control the delivery of the second material. The first and second solenoid valves 20 and 26 are operated electronically. A fan 30 includes fan blades 32 and a fan motor 36.

A material container 40 contains the first and second materials 41 that have been delivered by the first and second supplies 12 and 16. A first mixer 42 includes a first mixer motor 44 and a first mixing device 45 that is located inside the container 40. A second mixer 46 includes a second mixer motor 48 and a second mixing device 50 that is also located inside the container 40 on an opposite side of the container 40. A conductivity sensor 54 is located inside the container 40 in fluid contact with the first and second materials 41. A temperature sensor 56 is likewise located inside the container 40 in fluid contact with the first and second materials 41.

A furnace 60 is positioned adjacent to the container 40 and is connected to a gas supply 64. The furnace 60 heats the first and second materials. The furnace 60 includes a solenoid valve 66 for supplying gas to the furnace 60. The furnace 60 includes a pilot 68 and an ignition device 70 that lights the pilot when triggered by an electronic signal. A pilot sensor 72 generates a signal indicating whether a pilot flame is present or absent. A conduit 76 is connected to the container 40 and a finished product container 80. A solenoid valve 78 controls movement of fluid between the containers 40 and 80. After mixing and heating the two materials, a finished product is delivered to the finished product container 80 by actuating the solenoid valve 78.

Figure 2:
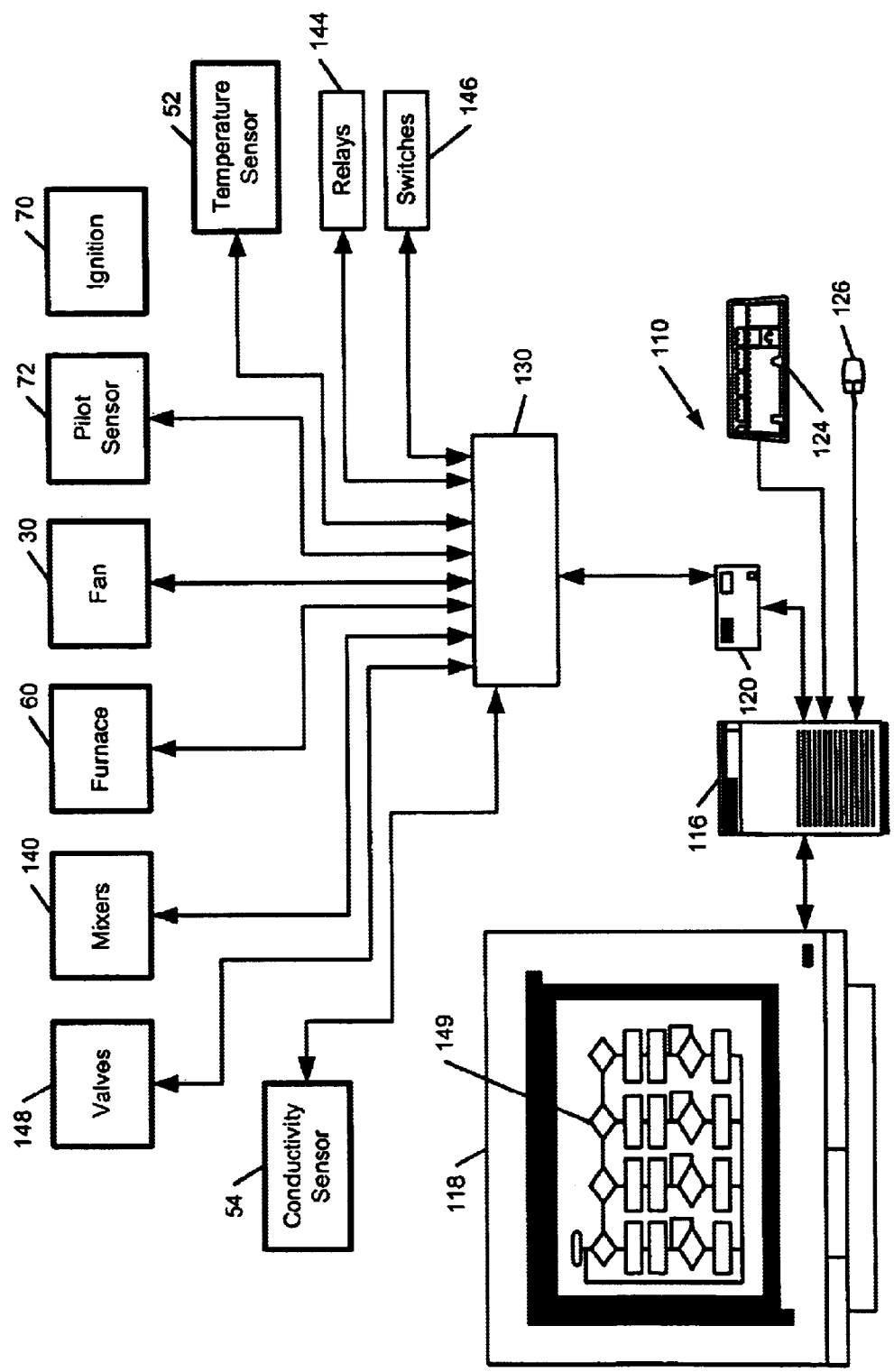
FIG. 2 is a functional block diagram of a flowchart-based programming and control system according to the invention.

Referring now to FIG. 2, a flowchart-based programming and control system is illustrated at 110. The programming and control system 110 includes a computer 116, a display 118, an input/output card (I/O) 120 and one or more I/O devices such as a keyboard 124 and/or a mouse 126. The I/O card 120 is connected to a communications network 130. The I/O card 120 can be an Ethernet card and the communications network 130 can be an Ethernet network. Skilled artisans can appreciate that other I/O cards and communications networks can be employed without departing from the spirit of the invention.

The communications network 130 is connected to the first and second mixers 42 and 46 (both of which are identified at 140 in FIG. 2). The communications network 130 is similarly connected to the fan 30, the pilot sensor 72, the ignition device 70, the temperature sensor 56, the conductivity sensor 54, one or more relays 144, one or more switches 146, and the solenoid valves 20, 26 and 66 (collectively identified at 148). The flowchart-based programming and control system 110 allows a user to create a flowchart 149 that includes active debugging objects as will be described further below.

Figure 3:
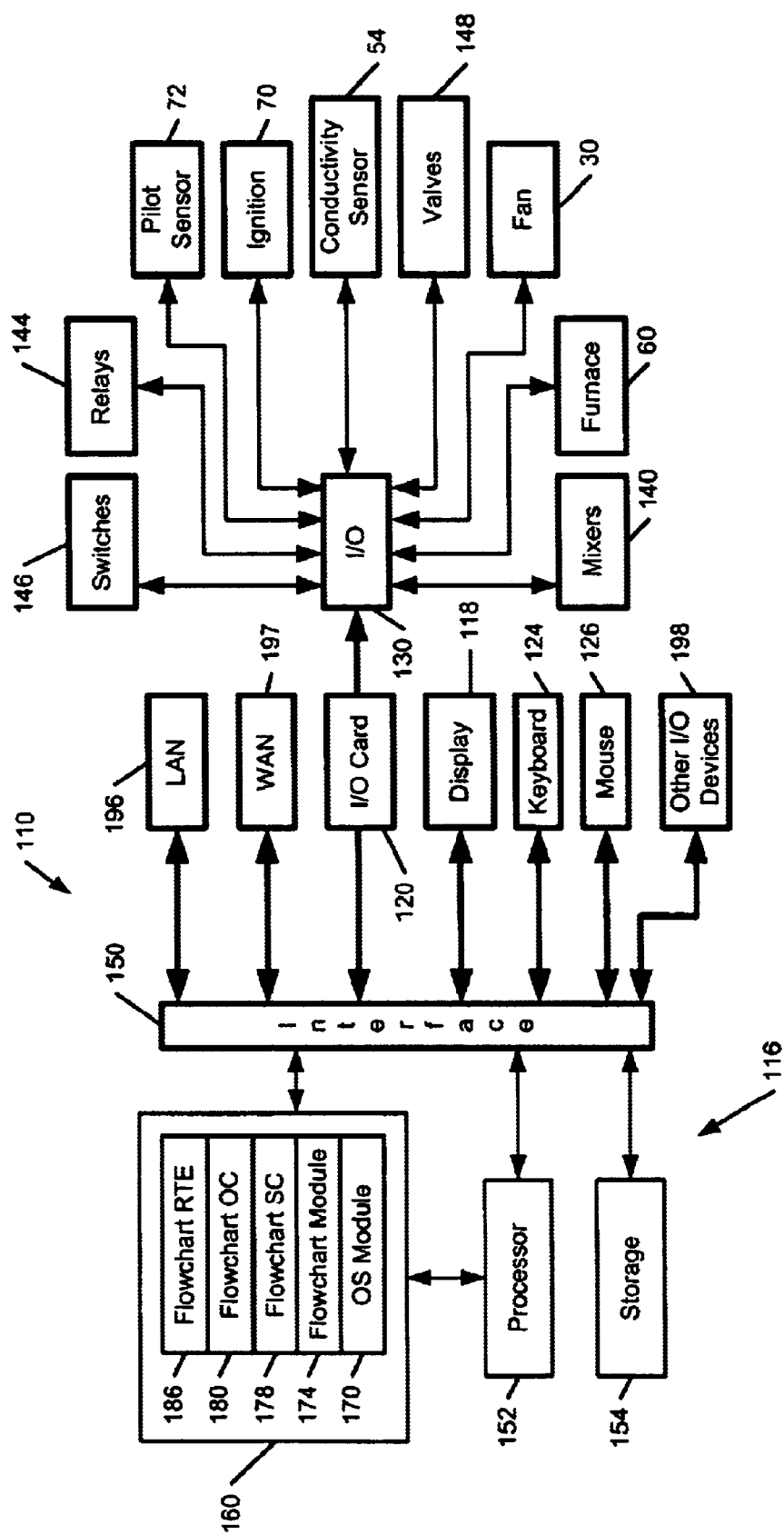
FIG. 3 is a more detailed functional block diagram of the flowchart-based programming and control system of FIG. 2.

Referring now to FIG. 3, the flowchart-based programming and control system 110 is illustrated in further detail. The computer 116 includes an I/O interface 150 that is connected to a processor 152 and memory storage 154 that can include floppy drives, hard drives, optical storage, etc. Memory 160 is connected to the processor 152 and the I/O interface 150. The memory 160 includes random access memory (RAM) and read only memory (ROM). When the computer 116 is booted up, the computer 116 loads an operating system (OS) module 170 which is preferably a multi-tasking OS, such as Windows 95®, Windows 98®, Windows 2000®, Windows NT®, and Windows NTE®.

After being selected and launched by the user, the computer 116 loads a flowchart module 174 into memory 160. As a user creates a flowchart, the flowchart module 174 generates flowchart source code 178 that can be stored in memory 160 or memory 154. When the user validates and debugs the flowchart source code 178, the user compiles the flowchart source code 178 and generates flowchart object code 180 that is executed by a flowchart run time engine 186 during operation of the process 10. During creation or editing of the flowchart 149, the user adds active debugging objects as will be described below. The I/O interface 150 can also be connected to a local area network (LAN) 196, a wide area network (WAN) 197, and one or more other I/O devices 198 such as scanners, printers, etc.

Figure 4:
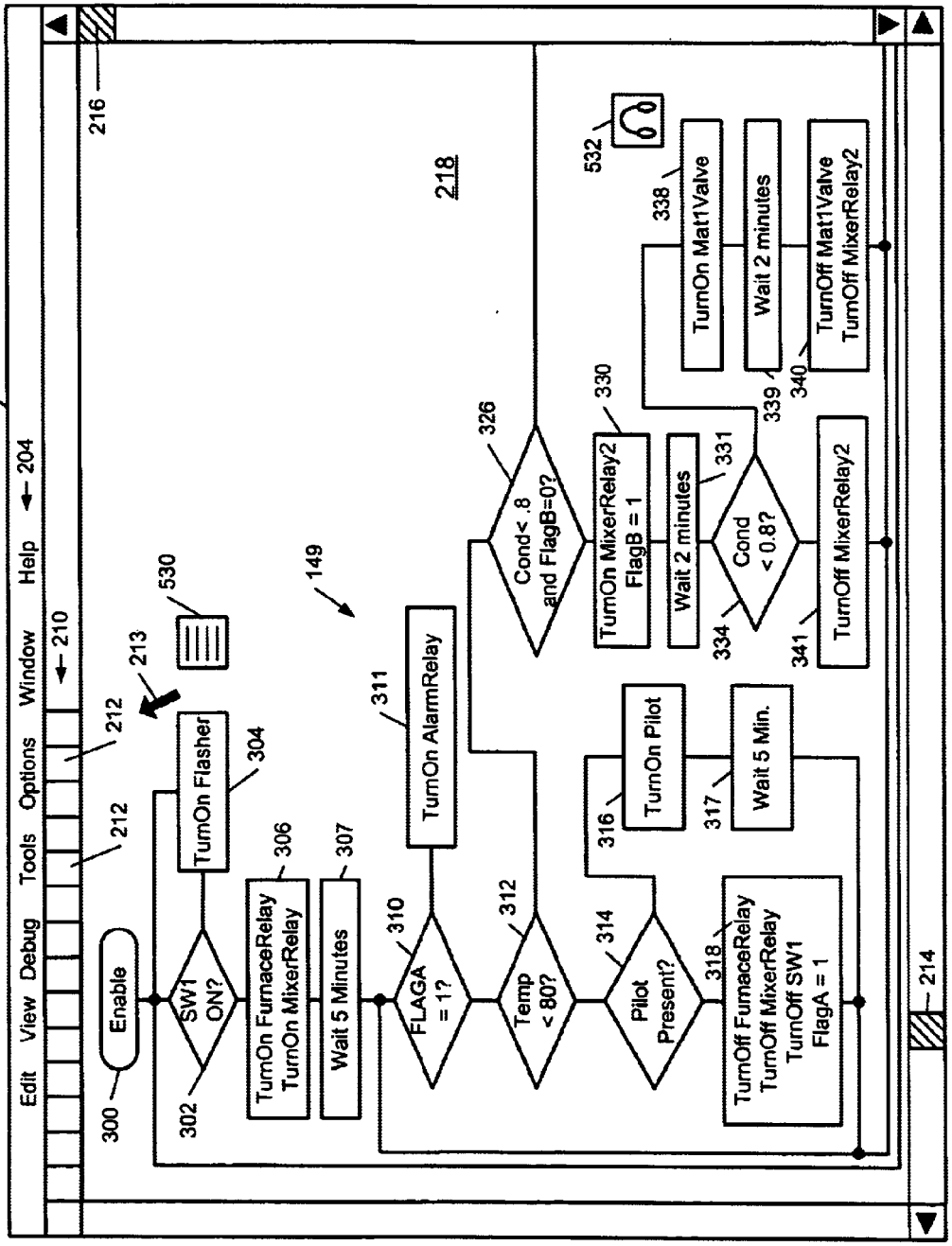
FIG. 4 illustrates a graphical user interface (GUI) screen view of an exemplary flowchart that is generated by the flowchart-based programming and control system and that includes active debugging objects that are added to the flowchart according to the invention.

Referring now to FIG. 4, the exemplary flowchart 149 is created using a pull-down menu 204, toolbar 210, and tools 212 and using a cursor 213 that is moved using the keyboard 124 and/or the mouse 126. Scroll bars 214 and 216 allows a user to navigate a flowchart design window 218. The exemplary flowchart 149 includes enable blocks, decision blocks, and action blocks.

Control begins at enable block 300 where variables are initialized. For example, Flag A and Flag B are set equal to zero. Control continues with decision block 302 where control determines whether a first switch is on. If the first switch is not on, control turns on a flasher at action block 304 and control returns to step 302. Otherwise, control continues with action block 306 where control turns on a relay associated with the furnace 60 and a relay associated with the mixer 42. Control waits five minutes at wait block 307 until the furnace 60 is operating and the mixer 42 has had sufficient time to mix the first and second materials. Then, control continues with decision block 310 where control determines whether Flag A is equal to one. If Flag A equals one, control turns on an alarm relay (not shown in FIG. 1) in step 311. Otherwise, control continues with decision block 312 where control determines if the temperature of the first and second materials 41 is less than 80° F. If the temperature is less than 80°, control continues with decision block 314 where control determines whether a pilot is present by scanning an output of the pilot sensor 72.

If the pilot is not present, control turns on the pilot using the ignition device 70, waits five minutes at wait block 317, and then returns to step 310. Otherwise, control continues with action block 318 where control turns off the furnace 60, the mixer 42, and the first switch, sets Flag A equal to 1, and continues with step 310.

If the temperature is greater than 80° F., control continues with decision block 326 where control determines whether the conductivity of the first and second materials 41 is less than 0.8 and a Flag B is equal to zero. If not, control continues with action block 330 where control turns on a relay associated with the second mixer 46, and sets the Flag B equal to one. In wait block 331, control waits 2 minutes. Control continues with decision block 334 where control determines whether the conductivity of the materials 41 is less than 0.8. If it is, control continues with step 338 where control turns on the solenoid valve 20 that is associated with the first material supply 12. Control waits two minutes in wait block 339. Control turns off the solenoid valve 20 and the relay that is associated with the second mixer 46 in action block 340 and continues with step 310. Otherwise, control continues with step 341 where control turns off the relay associated with the second mixer 46.

Figure 5:
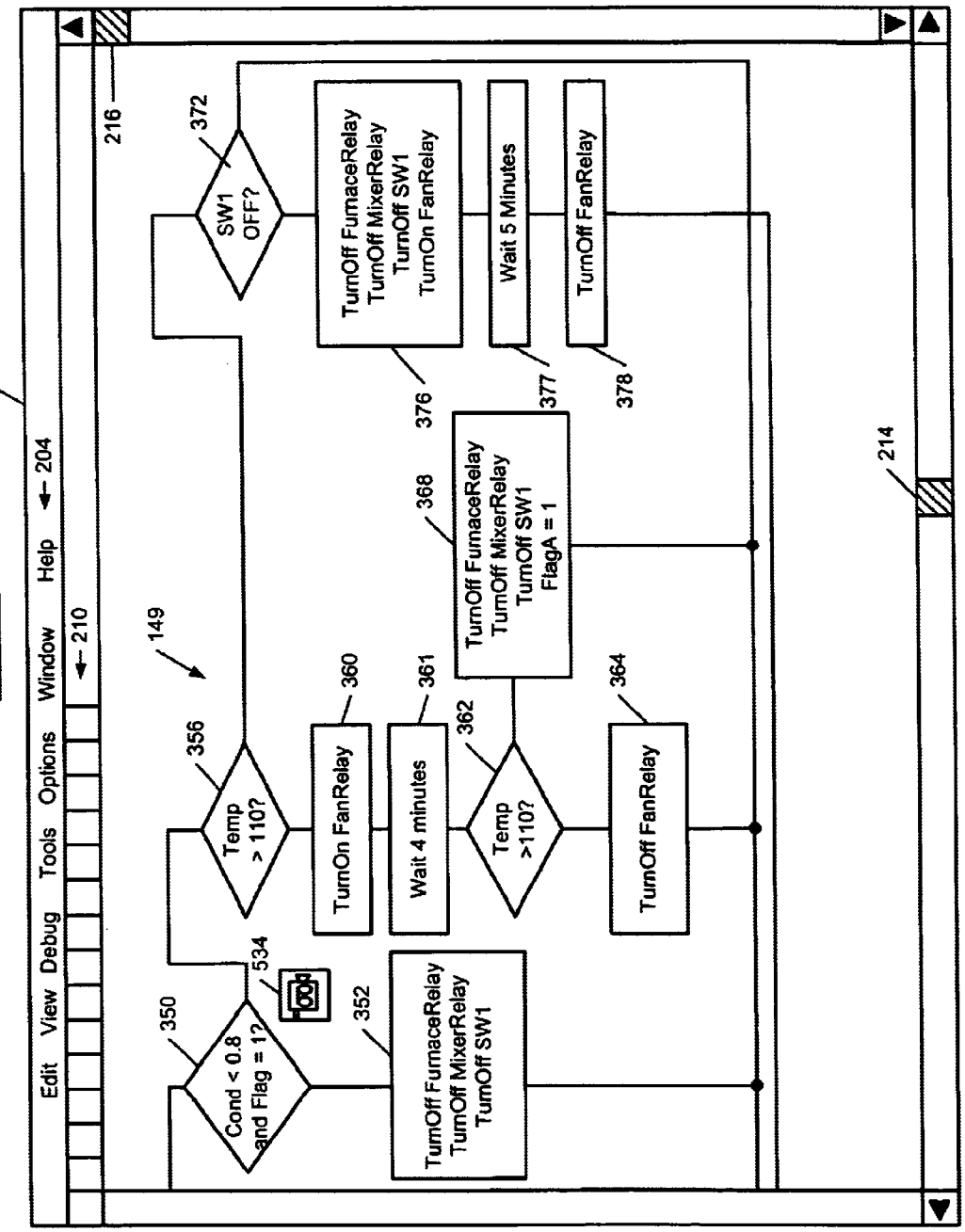
FIG. 5 illustrates a scrolled view of the GUI screen view of the exemplary flowchart of FIG. 4.

Referring now to FIG. 5, if the conductivity is greater than 0.8 or the flag is equal to zero, control continues from step 326 to step 350 where control determines if the conductivity is less than 0.8 and the flag equals one. If both conditions are met, control continues with step 352 where control shuts down the furnace relay, the mixer relay, and the first switch and continues with step 310. Otherwise, control continues with step 356 where control determines whether the temperature of the first and second materials 41 is greater than 110° F. If the condition is true, control continues with action block 360 where control turns on a fan relay to start the fan 30 to cool the first and second materials 41 and waits four minutes in wait block 361.

Control continues with decision block 362 where control determines whether the temperature still exceeds 110° F. If not, control turns off the fan relay associated with the fan 30 and continues with step 310. Otherwise, control continues with step 368, where control turns off the furnace relay, the mixer relay, and the first switch, sets Flag A equal to one, and continues with step 310. If the temperature does not exceed 110° F. in step 356, control continues with decision block 372 where control determines whether the first switch is off. If it is, control continues with action block 376 where control turns off the furnace relay and the mixer relay. Control turns on the fan relay associated with the fan 30. Control waits five minutes in wait block 377. Control turns off the fan relay in action block 378 and continues with step 302. Otherwise, control continues with step 310.

Figure 6:
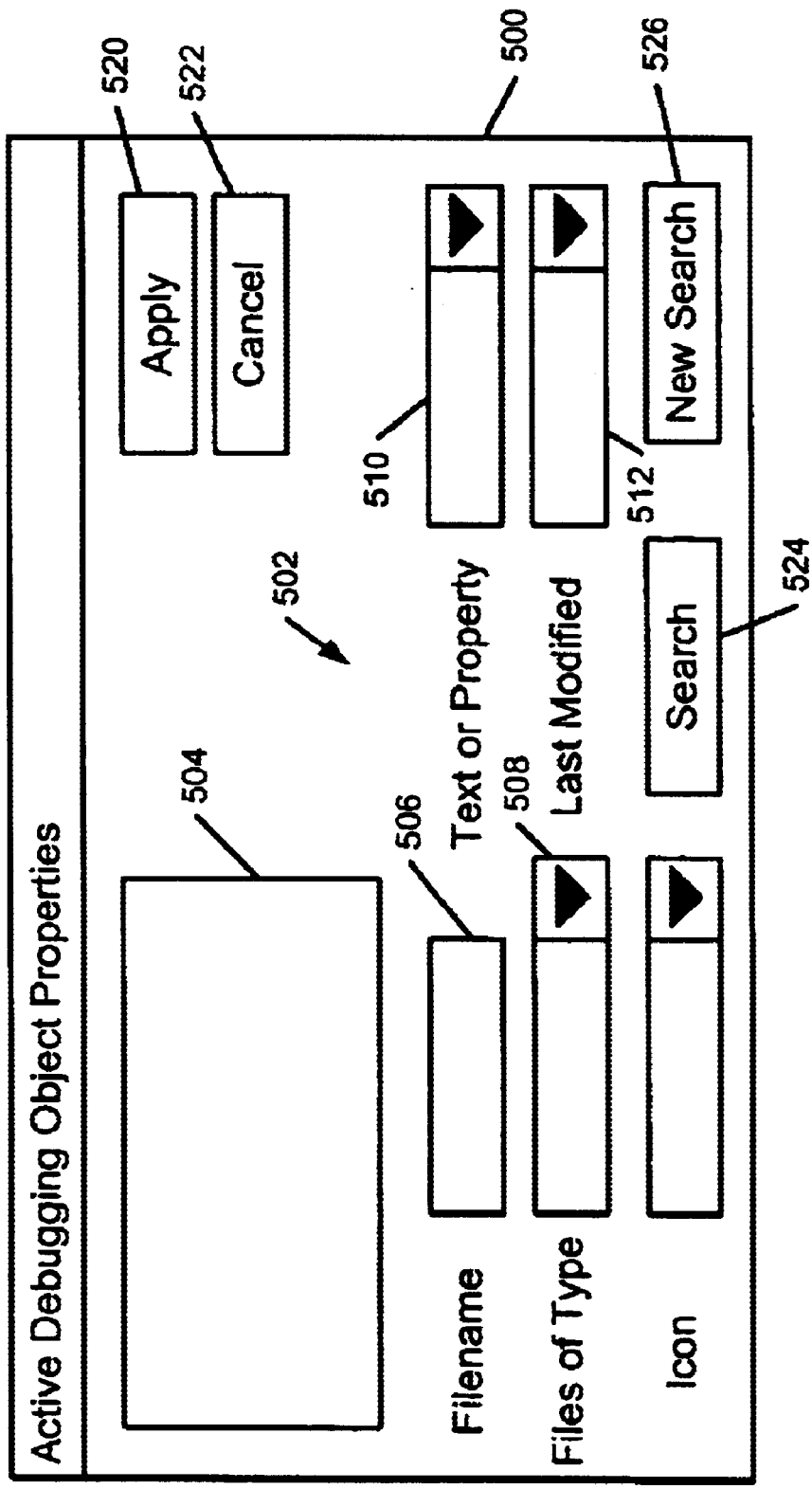
FIG. 6 illustrates an exemplary dialog box for setting properties of active debugging objects.

Referring now to FIG. 6, an active debugging object dialog box 500 that is provided by the flowchart module 174 while the flowchart source code is being created is illustrated. The active debugging object dialog box 500 includes a file search interface 502 for locating media such as video, audio, pictures, text or other content. A text window 504 lists file names for a selected directory. Text box 506 and drop down list boxes 508, 510 and 512 help a user select content for the active debugging object from files stored on the computer 116 and/or other computers that are connected to the LAN 196 or the WAN 197. Command buttons 520 and 522 allow a user to apply the content to the active debugging object or to cancel changes. Command buttons 524 and 526 allow a user to initiate a search or to select a new search. Skilled artisans can appreciate that other input formats other than the active debugging dialog box 500 can be employed without departing from the scope of the invention.

Referring now to FIGS. 4, 5 and 6, a user adds active debugging objects 530, 532 and 534 in the flowchart design window 218. The active debugging objects 530, 532 and 534 are represented by icons such as an icon representing a picture, an icon representing text, and/or an icon representing a movie clip. Still other icons will be apparent to skilled artisans. The active debugging objects 530, 532 and 534 are added using the pull-down menu 204, the toolbar 210 and/or the tools 212. The flowchart module 174 automatically creates ActiveX® components that are launched when a user clicks or otherwise selects the active debugging objects 530, 532 and/or 534 during the debugging process.

The active debugging object properties dialog box 500 is launched automatically when the active debugging objects 530, 532 and 534 are added to the flowchart design window 218. The active debugging object properties dialog box 500 can also be accessed by left-clicking on the active debugging objects 530, 532 and 534 or by using the pull-down menu 204, the toolbar 210, the tools 212 and/or using hot keys or other keyboard combinations. The active debugging object properties dialog box 500 allows the programmer to associate the active debugging objects 530, 532 and 534 with help files that include text and images, with multi-media content such as audio and video, with links to web sites containing relevant information or with other suitable content. The active debugging objects 530, 532 and 534 contain content that helps programmers debugging the control logic more quickly.

As can be appreciated from the foregoing, the active debugging objects provide audio and/or visual feedback during the debugging process. By providing the audio and/or visual feedback that relates to the flowchart code located near the active debugging objects, the debugging of control logic contained in flowcharts is made easier. Alternately, the audio and/or visual feedback provided by the active debugging object can relate to the part of the process that is impacted by the flowchart code that is located near the active debugging object. For example, the active debugging object can include a movie clip demonstrating the desired operation of the process along with the correct values of the control variables at different logical points in the control logic. The active debugging object can also include a step-by-step troubleshooting guide for eliminating the bug(s). The active debugging object can be a link to the web site of a device that is controlled by the control logic that is near the active debugging object.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A machine programming and control system, comprising:
   a computer including a processor, memory and a display;
   a device associated with a process; and
   a flowcharting module executed by said computer that generates and edits a flowchart that contains action and decision blocks that define logic for operating said device to further said process, wherein said flowcharting module allows active debugging objects to be added to said flowchart, wherein said active debugging objects are user actuated and are linked to at least one of a file, a document and a software component.

2. The machine programming and control system of claim 1 wherein said active debugging objects provide information relating to at least one of debugging of flowchart code and debugging of a portion of said process that is related to said flowchart code.

3. The machine programming and control system of claim 1 wherein said active debugging objects include an icon that is added to said flowchart adjacent to related flowchart code to visually identify said active debugging object.

4. The machine programming and control system of claim 1 wherein said active debugging object provides at least one of audio and visual feedback.

5. The machine programming and control system of claim 1 wherein said active debugging object provides at least one of audio, a movie clip, a link to a website and textual information.

6. The machine programming and control system of claim 1 wherein said active debugging object includes at least one of audio, a movie clip, a link to a website and text demonstrating the desired operation of the process.

7. The machine programming and control system of claim 1 wherein said active debugging object includes at least one of audio, a movie clip, a link to a website and text describing correct values for control variables at a first logical point in said flowchart.

8. The machine programming and control system of claim 1 wherein said at least one of said file, said document and said software component provides a desired value of variables that are associated with at least one flowchart block that is located adjacent to said active debugging object.

9. A method of operating a machine programming and control system, comprising:

generating and editing a flowchart using a flowcharting module;

adding action and decision blocks to said flowchart to define logic for operating a device to further a process;

adding active debugging objects to said flowchart, wherein said active debugging objects are user actuated; and linking said active debugging objects to at least one of a file, a document and a software component.

10. The method of claim 9 wherein said active debugging objects provide information relating to at least one of debugging of flowchart code and debugging of a portion of said process that is related to said flowchart code.

11. The method of claim 9 further comprising adding said active debugging objects to said flowchart adjacent to related flowchart code.

12. The method of claim 9 further comprising providing at least one of audio and visual feedback using said active debugging object.

13. The method of claim 9 further comprising providing at least one of audio, a movie clip, a link to a website and textual information using said active debugging object.

14. The method of claim 9 further comprising providing at least one of audio, a movie clip, a link to a website and text demonstrating the desired operation of the process using said active debugging object.

15. The method of claim 9 further comprising wherein providing at least one of audio, a movie clip, a link to a website, and text describing correct values for control variables at a first logical point in said flowchart using said active debugging object.

16. The method of claim 9 wherein said at least one of said file, said document and said software component provides a desired value of variables that are associated with at least one flowchart block that is located adjacent to said active debugging object.

* * * * *